US008403227B2

(12) United States Patent
Day

(10) Patent No.: US 8,403,227 B2
(45) Date of Patent: Mar. 26, 2013

(54) METHOD AND APPARATUS FOR PINLESS TAG SECURING

(75) Inventor: Alan Day, Pembroke Pines, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 113 days.

(21) Appl. No.: 12/894,738

(22) Filed: Sep. 30, 2010

(65) Prior Publication Data

US 2012/0080526 A1 Apr. 5, 2012

(51) Int. Cl.
*G06K 13/08* (2006.01)

(52) U.S. Cl. ..................... 235/486; 235/484; 340/572.1; 340/572.8; 340/572.9; 70/57.1

(58) Field of Classification Search ............. 70/39, 57.1, 70/58, 277, 320, 15; 340/572.9, 572.1, 572.8, 340/571; D8/330, 332, 349; 235/484, 486
See application file for complete search history.

(56) References Cited

U.S. PATENT DOCUMENTS 5,969,613 A * 10/1999 Yeager et al. .............. 340/572.9
2008/0289372 A1* 11/2008 Rendon et al. ................ 70/57.1

FOREIGN PATENT DOCUMENTS

WO WO 2010/056261 5/2010

OTHER PUBLICATIONS

EPO International Search Report dated Feb. 10, 2012 for corresponding appln PCT/US11/001672.

* cited by examiner

*Primary Examiner* — Michael G Lee
*Assistant Examiner* — Tabitha Chedekel
(74) *Attorney, Agent, or Firm* — Kacvinsky Daisak PLLC

(57) ABSTRACT

A security device is removably affixable to an article. The security device includes a housing having a securing pad, a locking element and a strap. The locking element is disposed within the housing. The strap includes a first end having a latching region that is insertable into the housing and a second end having a securing region. The strap is slidingly movable between an open position and a locked position. The locking element engages with the latching region of the strap. An eccentrically mounted wheel may be mounted on one of the securing region of the strap and the securing pad. When in the locked position, the eccentrically mounted wheel secures the article between the securing pad and the securing region of the strap.

27 Claims, 11 Drawing Sheets

METHOD AND APPARATUS FOR PINLESS TAG SECURING

BACKGROUND OF THE INVENTION

1. Field of the Invention

Embodiments of the invention generally relate to the field of Electronic Article Surveillance ("EAS") systems for the prevention of unauthorized removal of an item from a controlled area, and more particularly to a pinless EAS security tag that securely attaches to an item of merchandise without penetrating the item.

2. Discussion of Related Art

Electronic Article Surveillance ("EAS") systems are used in retail settings to prevent unauthorized removal of items from a controlled area. EAS systems may comprise a monitoring system and one or more security tags (also referred to as labels) attached to articles to be protected from unauthorized removal. The monitoring system establishes a surveillance zone (also referred to as an interrogation zone), often at an access point for the controlled area. Articles which are authorized for removal from the area can have their security tags deactivated or removed so as not to be detectable by the monitoring system. If a monitored item enters the surveillance zone with an active security tag, an alarm may be triggered to indicate possible unauthorized removal of the item.

Security tags for EAS systems can be constructed in any number of configurations. The desired configuration of the tag or label is often dictated by the nature of the article to be protected. For example, prepackaged goods which are subject to retail theft, such as CDs, DVDs, small electronic devices, etc., may contain an EAS label disposed within the packaging in such a way that it is hidden from the consumer at least during the pre-purchase period.

An EAS label may also be enclosed in a rigid housing which can be secured to a monitored item, such as hard tags containing EAS labels which are commonly attached to clothing in retail stores. The rigid housing typically includes a pin which is inserted through the fabric and secured in place on the opposite side. The housing cannot be removed from the clothing without destroying the housing except by using an EAS deactivator/remover.

As can be appreciated, such pinned EAS labels can cause damage to the fabric in which the pin is inserted. High-end retailers and customers dislike having expensive merchandise, such as, for example, leather goods, suffer damage in order to prevent theft. Shoes are especially difficult to protect using pinned EAS labels, and the material the shoe is constructed from often suffers permanent damage from the pin.

Shoes present other difficulties for pinned EAS tags because shoe materials are often too rigid to insert the pin. Many retailers attempt to secure their merchandise using these hard tags in combination with pins, lanyards or both through a lace eyelet or in the tongue area. This practice is fine for a few shoe types, but the tag/pin/lanyard interferes with the fitting and lacing process of the merchandize. Thus, many shoes, boots and expensive or strapped women's shoes cannot be tagged at all. In addition, for items such as boots, pin may be too short to extend through the thickness of the boot material, thereby preventing the pin from being secured.

Pinless EAS systems have been developed which "pinch" an article between a housing portion of the device and an arm portion of the device. Such pinless systems rely on the static force between the housing and the arm to maintain contact with the article being protected. For articles having smooth surfaces, such as leather, removal of the device is possible by steadily working out the article from between the arm and the housing.

Thus, there remains is a need for a pinless EAS security device that is attachable to items of merchandise without penetrating or otherwise damaging the items, and which provides enhanced protection against unwanted removal. The device should be effective for protecting articles of all types (e.g., thin materials, thick materials), including those having smooth surfaces.

SUMMARY OF THE INVENTION

A pinless Electronic Article Surveillance ("EAS") security device, system, and method for attaching the pinless EAS security device to an article of merchandise are therefore disclosed. The disclosed device protects tagged articles from being removed from a monitored area without penetrating the article. In accordance with one embodiment, a security device is removably affixable to an article. The security device includes a housing, a locking element and a strap. The housing includes a securing pad. The locking element is disposed within the housing. The strap includes a first end having a latching region that is insertable into the housing and a second end having a securing region. The strap is slidingly movable between an open position and a locked position. The locking element is engageable with the latching region of the strap. The strap, when in the locked position is at least partially retained within the housing and secures the article between the securing pad and the securing region of the strap.

In some embodiments, the securing region of the strap includes an eccentric wheel. The eccentric wheel is mounted to the strap so that as the wheel is rotated in a first direction, a surface of the wheel moves closer to the securing pad, pinching the article between the strap and the securing pad, and locking the security device to the article.

In other embodiments, an eccentric wheel is mounted to the housing adjacent to the securing pad. The eccentric wheel is mounted to the housing so that as the wheel is rotated in a first direction a surface of the wheel is moved closer to the securing region of the strap, pinching the article between the strap and the securing pad, and locking the security device to the article.

A security device is disclosed comprising a housing including a securing pad, a locking element disposed within the housing, and a strap. The strap may include a first end having a latching region, the latching region being insertable into the housing, and a second end having a securing region. The strap may further include an eccentric wheel mounted to one of the housing and the strap. The strap is movable between an open position and a locked position. The locking element is engageable with the latching region of the strap, and the strap, when in the locked position is at least partially retained within the housing and secures the article between the eccentric wheel and one of the securing pad and the securing region of the strap.

A system is disclosed for securing an article, comprising a security device including a housing having a securing pad region, and a strap. The strap may have first and second ends, the first end having a latching region insertable into the housing, the second end having a securing region. The strap may further include a locking element ahving a magnetically actuable latch and a flexible locking element to bias the magnetically actuable latch and the latching region of the strap into a locked position. The strap may also include an eccentric wheel mounted to one of the securing pad region of the housing and the securing region of the strap. The strap is movable between an open position and a locked position, and the locking element is engageable with the latching region of the strap. The strap, when in the locked position, is at least partially retained within the housing and secures an article between the eccentric wheel and one of the securing pad and the securing region of the strap. The system may further include a magnetic detacher operable to configure the security device from the locked position to the open position.

A method is disclosed for protecting an article from theft. The method comprises affixing a security device to a portion of the article, the security device including a housing including a securing pad region, a locking element disposed within the housing, and a strap. The strap comprises a first end having a latching region insertable into the housing, and a second end having a securing region, and an eccentric wheel mounted to one of the securing pad region of the housing and the securing region of the strap. The method may further comprise moving the strap from an open position to a locked position to secure an article placed between the strap and the housing between the eccentrically mounted wheel and the securing pad region or the securing region.

BRIEF DESCRIPTION OF THE DRAWINGS

The accompanying drawing illustrates an exemplary embodiment of the disclosed device so far devised for the practical application of the principles thereof, and in which.

DESCRIPTION OF EMBODIMENTS

Figure 1:
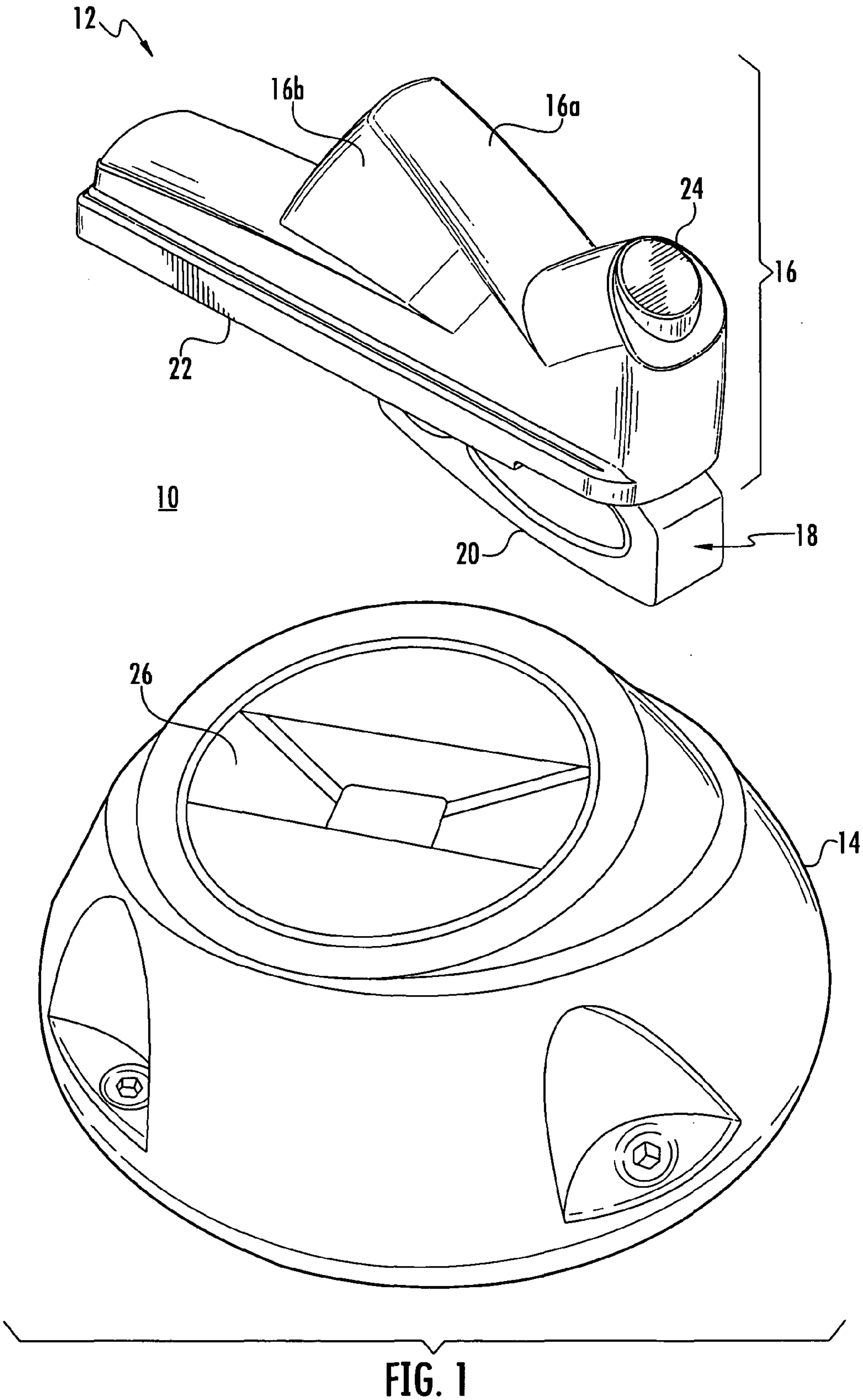
FIG. 1 is a perspective view of a pinless electronic article surveillance ("EAS") security device and system, in accordance with one embodiment.

It will be appreciated that embodiments of the disclosed method and apparatus reside in combinations of apparatus components and processing steps related to implementing apparatuses, systems and methods for securing pinless EAS security devices to items of merchandise without penetrating or otherwise damaging the item. Accordingly, system and method components have been represented where appropriate by conventional symbols in the drawings, showing only those details that are believed to be pertinent to understanding the embodiments and so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment may include, for example, a pinless EAS security device comprising a securing mechanism, locking mechanism, security tag, and a housing. The securing mechanism may comprise a strap and a securing pad. The strap may be any suitable materials, such as metal or plastic and may be rigid or flexible. The strap includes a securing side and latching side. The securing side of the strap may extend outward from the housing and secure the pinless EAS security device to an item by entrapping a portion of an article between the strap and the securing pad.

The locking mechanism may include a magnetically actuable latch and a flexible element that biases the magnetically actuable latch toward a locking position. The latching side of the strap mates with at least a portion of the magnetically actuable latch in the locking position. As used herein, the "locking position" may refer to the position of the magnetically actuable latch in which it is partially or fully within a void of, in engagement with, joined with, or otherwise mated with the latching side of the strap. The housing may be a structure configured to secure the locking mechanism, security tag, securing mechanism, and the article to the housing. As secured, the magnetically actuable latch of the locking mechanism may mate with the latching side of the strap in the locking position to lock the housing, and thus the security tag with which the housing is secured, to the article. When the housing is locked, the security device may prevent or provide resistance to an attempt to separate the housing from the article. It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Numerous specific details may be set forth herein to provide a thorough understanding of the embodiments. It will be understood by those skilled in the art, however, that the embodiments may be practiced without these specific details. In other instances, well-known methods, procedures and components have not been described in detail so as not to obscure the embodiments. It will be appreciated that the specific structural and functional details disclosed herein may be representative and do not necessarily limit the scope of the embodiments.

Referring now in detail to the drawings wherein like parts are designated by like reference numerals throughout, there is illustrated in FIG. 1 a perspective view of components that may be included in an EAS security system 10 in accordance with one embodiment. In the illustrated embodiment, the security system 10 includes a security device 12 and a detacher 14 used to remove the security device 12 when attached to an item of merchandise. The security device 12 may include a housing 16 having two conjoining halves 16*a*, 16*b* molded from a polymer and/or another rigid material or materials. A securing mechanism 18, such as a strap 20, is movable between an open position and a locked position. When security device 12 is attached to an article, the strap 20 is moved to the locked position where the article is trapped or sandwiched between the strap 20 and a securing side 22 of the housing 16.

The housing 16 further includes a protrusion 24 designed to fit into an indented detaching zone 26 of the magnetic tag detacher 14 in order to move the strap from the locked position to the unlocked position so that the security device 12 may be removed from the protected article.

Figure 2A:
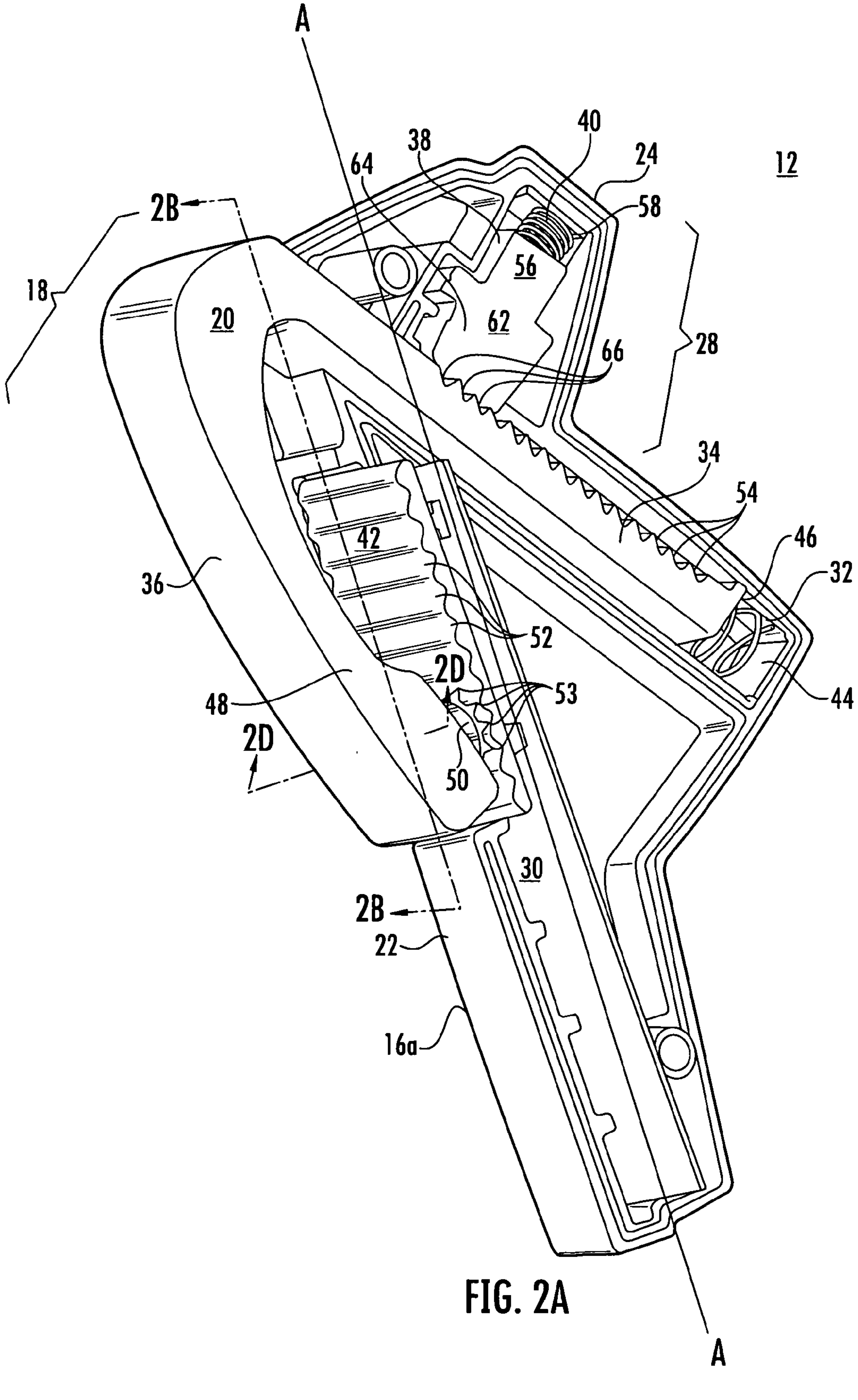
FIG. 2A is a rear/left-side perspective view of the device of FIG. 1, with the left half of the housing removed.

Referring now to FIG. 2A, a rear/left-side perspective view of the security device 12 is shown with the left half 16*b* of the housing removed. The security device 12 may include a securing mechanism 18, a locking mechanism 28, a detectable security element 30 and a housing 16. The securing mechanism 18 may include a strap 20 and a flexible channel element 32. The strap 20 has a latching side 34 and a securing side 36. The locking mechanism 28 may be a magnetically actuable locking mechanism, and may include a magnetically actuable latch 38 and a flexible locking element 40. The flexible locking element 40 (e.g., a spring), in a locked position, is biased to apply an upward force on the magnetically actuable latch 38, thereby causing the magnetically actuable latch 38 to engage the latching side 34 of the securing mechanism 18.

The housing 16 may be any casing or other structure that partially or fully contains and/or surrounds, encloses, affixes to, interlocks with, or otherwise secures the locking mechanism 28 and detectable security element 30, a portion of the securing mechanism 18, and an article when the locking mechanism 28 is in the locking position and the housing 16 is thereby locked. The housing 16 and locking mechanism 28 may thus cooperate to secure, or lock, the article to the housing 16, and thus the security device 12. The housing 16 may be configured as desired, and may be shaped based upon the shapes of the locking mechanism 28, detectable security element 30, and article for which it is designed to secure, such as described below with respect to embodiments of the housing 16. The housing 16 may include a securing pad 42, which may be integral with the housing 16 or may be a separate piece mounted on the securing side 22 of the housing 16. The housing 16 may alternatively be configured to pair with the securing pad 42. The interior of the housing 16 may further comprise a rectangular channel 44 which encompasses a portion of the latching side 34 of the strap 20 and allows the strap 20 to slide along the channel 44. The channel 44 is oriented at an acute angle of approximately 35° with respect to the securing side 36 of the housing 16.

In one embodiment, the strap 20 may comprise or may be formed of a nonmagnetic material such as aluminum, plastic or a die-cast alloy. The strap 20 may comprise a "U-shaped" or "V-shaped" element wherein one side of the U (or V) is a latching side 34 and the other side is a securing side 36. The angle between the latching side 34 and the securing side 36 may be an acute angle of approximately 20-60°. The latching side 34 partially resides in the housing 16 within the rectangular channel 44. The latching side 34 of the strap 20 slides within the channel 44 to allow the strap 20 to move from an open position to a locked position. A flexible channel element 32 is compressed between the bottom surface 46 of the latching side 34 of the strap and an outer wall of the housing 16, thereby biasing the flexible element 32 to apply an upward force to the bottom surface 46 of the latching side 34 of the strap 20 and causing the strap 20 to tend to rest in an open position. The flexible channel element 32 may be a cylindrical spring, an elliptical spring, a cantilever arm, such as, for example, a leaf spring or any other shape, as long as the flexible channel element 32 serves to apply an upward force on the bottom surface 46 of the latching side 34 of the strap 20.

The securing side 36 of the strap 20 includes an end portion 48 that partially houses an eccentrically-mounted wheel 50 that is configured to trap an article between the wheel 50 and the securing pad 42 of the housing 16. The eccentrically-mounted wheel 50 may be mounted to the end portion 48 of the strap 20 via a pin 51 so that the wheel 50 is rotatable with respect to the end portion 48 about an axis perpendicular to the longitudinal axis "A-A" of the security device 12.

Figure 2B:
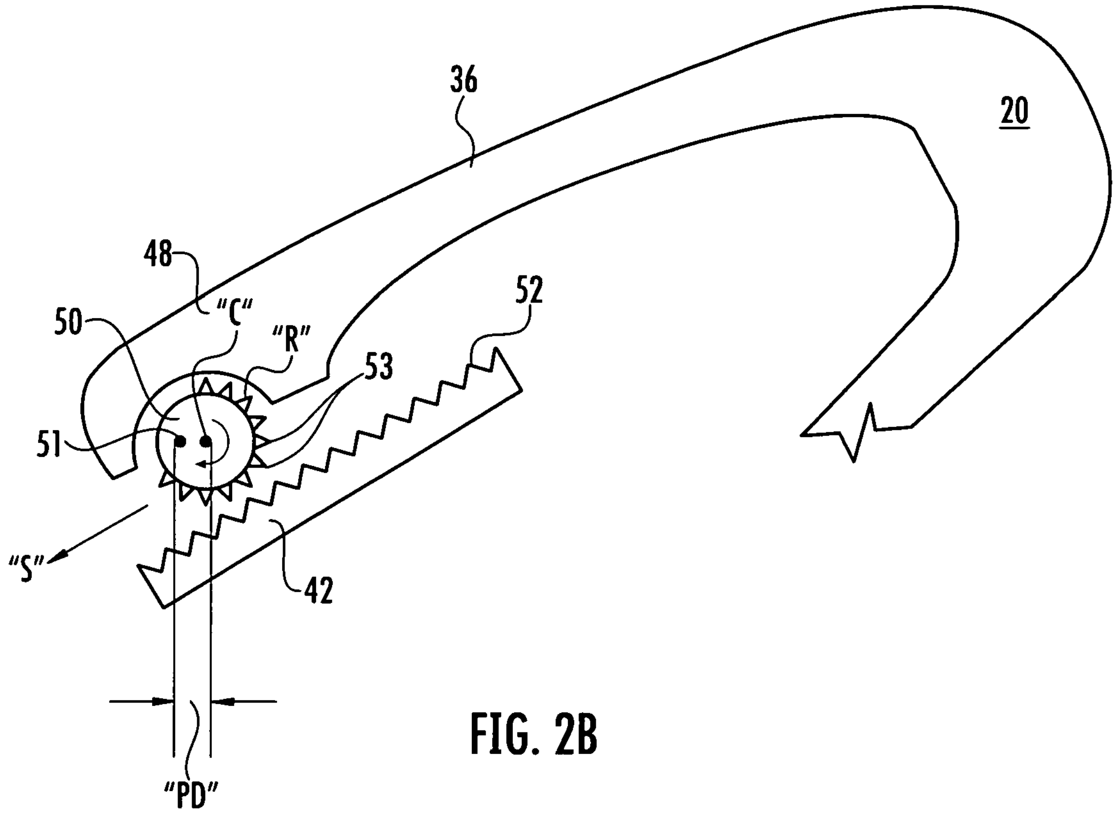
FIG. 2B is a partial cross-section view of the device of FIG. 2A, taken along line 2B-2B.

As shown in FIG. 2B, the pin 51 is located a distance "PD" from the centroid "C" of the wheel 50. Thus, when the wheel 50 is rotated about the pin 51 in the direction of arrow "R," the wheel extends out of the end portion 48 of the strap 20 and moves closer to the securing pad 42 of the housing 16. This is best seen with reference to FIG. 2C, which shows the "non-rotated" and "rotated" positions of wheel 50. In the left-most figure (identified as position "A"), an outer surface of the wheel 50 is located a distance "D1" from the top surface of the securing pad 42. As the wheel is rotated about the pin 51 in the direction of arrow "R" the eccentric mounting of the wheel causes the outer surface of the wheel to move closer to the securing pad 42. Thus, position "B" (the right-most figure) shows the wheel 50 after rotation, in which the outer surface of wheel 50 is located a distance "D2" from the top surface of the securing pad 42. As can be seen, "D2" is smaller than "D1." For clarity, the wheel 50 is shown without protrusions 53. FIG. 2D shows the arrangement of the wheel 50 pinned to the end portion 48 of the strap 20. Generally, the pin 51 may be mounted on the end portion 48 so that it can rotate with respect to the end portion and/or the wheel 50. Alternatively, the pin 51 may be fixed with respect to the end portion 48 and rotatable with respect to the wheel 50. The particulars of this interaction are not critical, as long as the wheel 50 is free to rotate with respect to the end portion 48.

Thus arranged, when security device 12 is attached to an article, the strap 20 is moved to a closed position where the article is trapped or sandwiched between the wheel 50 and the securing pad 42. Protrusions 53 positioned on the outer surface of the wheel 50 "bite" into the material of the article. If an attempt is made to remove the security tag 12 from the article (by moving the article in the direction of arrow "S" (FIG. 2B), movement of the article will cause the wheel 50 to rotate in the direction of arrow "R", due to the engagement between the protrusions 53 and the article. As wheel 50 rotates, it extends from the end portion 48 of the strap 20 and moves toward the securing pad 42, further pinching the article between the wheel 50 and the securing pad 42. The farther the article is moved in the direction of arrow "S", the greater the pinching force between the wheel 50 and the securing pad 42. In this way, unwanted removal of the security device 12 from the article is prevented.

It will be appreciated that this progressive engagement system provides an effective method for preventing unwanted removal of the security device 12 from articles having smooth surfaces, such as leather, without damaging the article's surface.

To enhance engagement between the wheel 50 and an article, the wheel 50 may have one or more protrusions 53 disposed on an outer surface of the wheel. The amount and type of protrusions 53 may vary depending upon the type of article to be secured. In the illustrated embodiment, these protrusions 53 have a triangular cross-section. Other geometries are contemplated, such as rounded ribs.

The wheel 50 may be made from an elastomeric material, such as rubber. The wheel 50 may also be made of a polymer that has an elastomeric coating. In one exemplary embodiment, the wheel is made from a polymer having a soft elastomeric material molded around it.

The protrusions 53 may be made from a soft elastomeric material to enable them to effectively engage an article, and to provide a desired level of friction between the protrusions and the article. In one exemplary embodiment, the protrusions 53 are formed from a soft elastomeric material that is molded over a harder polymeric wheel 50.

In the illustrated embodiment, the securing pad 42 includes protrusions, such as rows of teeth or ridges 52 designed to operate in conjunction with the protrusions 51 of the eccentric wheel 50 to securely grip the material of an article and prevent the security device 12 from being removed from the article when the strap 20 is in a locked position. It will be appreciated, however, that such protrusions 52 are not critical, and thus a securing pad 42 without protrusions can also be used.

The securing pad 42 may comprise a metal, polymer, ceramic, and/or another material or materials, as long as the material is rigid enough to prevent the housing 16 from being forcibly removed from the article, when secured to the article, without destroying or damaging the detectable security element 30 or article.

Figure 2C:
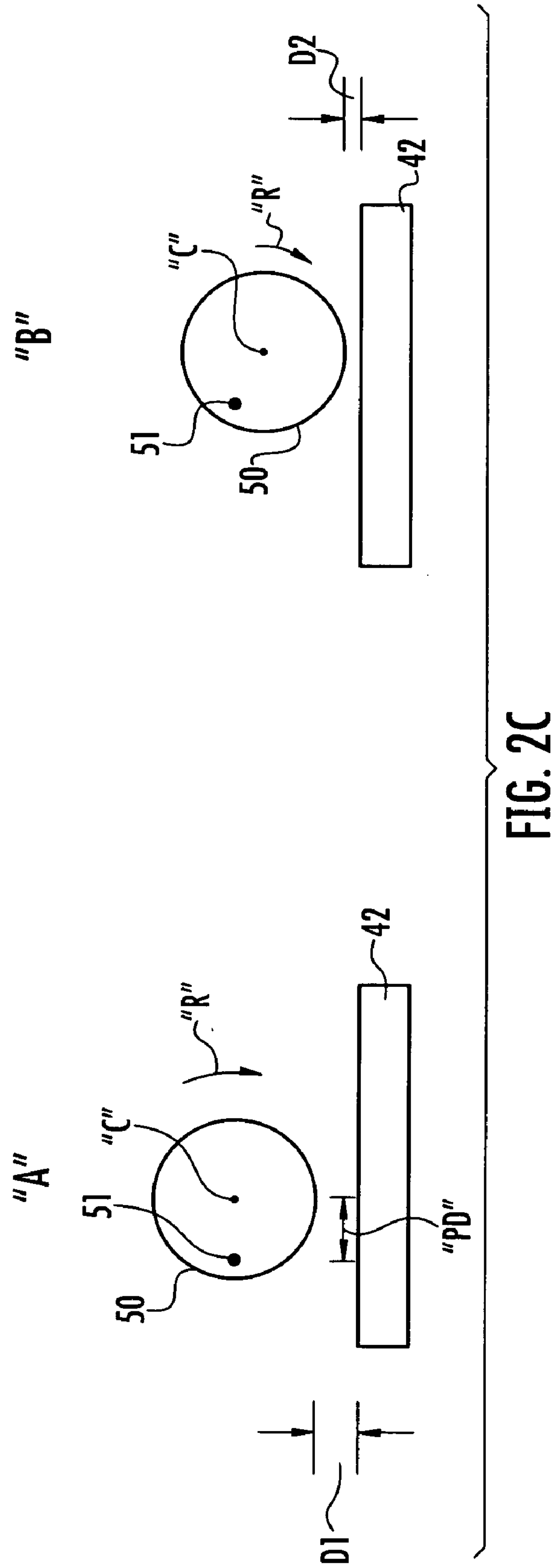
FIG. 2C shows detail views of the operation of the eccentric wheel of the device of FIG. 2A.
Figure 2D:
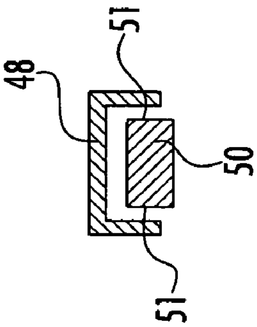
FIG. 2D is a cross-section view of the device of FIG. 2A, taken along line 2D-2D
Figure 2E:
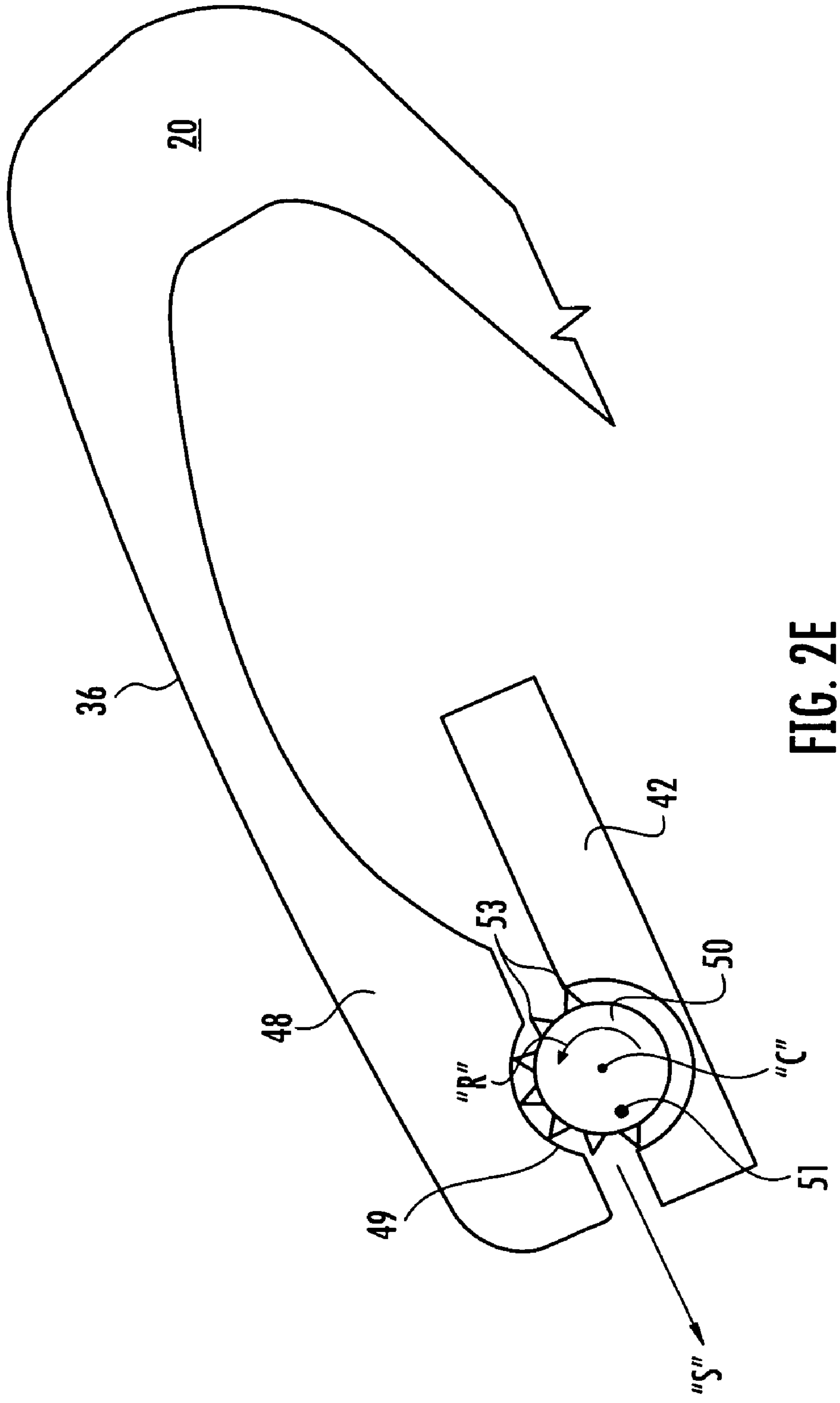
FIG. 2E is an alternative cross-section view of the device of FIG. 2A.

FIG. 2E shows an alternative arrangement of the disclosed device in which the eccentrically mounted wheel 50 is mounted to the housing 16 in lieu of the strap 20. In this embodiment, the wheel 50 is mounted to the housing via a pin 51 positioned adjacent to the securing pad 42. Rotation of the wheel 50 about the pin 51 in the direction of arrow "R" causes an outer surface of the wheel 50 to move closer to the end portion 48 of the strap. Thus, operation of this embodiment is substantially the same as that described in relation to the embodiment illustrated in FIGS. 2A-2C. Thus, if an attempt is made to remove the security tag 12 from the article (by moving the article in the direction of arrow "S", movement of the article will cause the wheel 50 to rotate in the direction of arrow "R", due to the engagement between the protrusions 53 and the article. As wheel 50 rotates, it extends from the securing pad 42 of the housing 16 and moves toward the end portion 48 of the strap 20, further pinching the article between the wheel 50 and the securing pad end portion 48. The farther the article is moved in the direction of arrow "S", the greater the pinching force between the wheel 50 and the end portion 48. In this way, unwanted removal of the security device 12 from the article is prevented.

The end portion 48 of the strap 20 has a surface 49 that opposes the protrusions 53 of the wheel 50. In the illustrated embodiment, this surface 49 is smooth. This surface 49 may include protrusions, such as rows of teeth or ridges 52 designed to operate in conjunction with the protrusions 51 of the eccentric wheel 50 to securely grip the material of an article and prevent the security device 12 from being removed from the article when the strap 20 is in a locked position. These protrusions may be rigid, or they may be flexible.

As noted, the wheel 50 of this embodiment may include protrusions 53 that are the same or similar to protrusions 53 described in relation to the embodiment illustrated in FIGS. 2A-2C. In addition, the wheel 50 may be made from the same or similar materials as described in relation to the embodiment illustrated in FIGS. 2A-2C.

The latching side 34 of the strap 20 includes a plurality of parallel ridges 54, such as ribs, teeth, notches, jags, points, curves, voids, or other shapes, which engage the magnetically actuable latch 38 to secure the strap 20 in a locked position and prevent the latching side 34 from being extended from the housing 16. The latching side 34 of the securing mechanism 16 may be configured as desired, such as with one or more holes or other voids, ribs, teeth, protrusions, or other shapes. The latching side 34 may be configured to engage, receive, insert into, or otherwise mate with at least a portion of the magnetically actuable latch 38.

The magnetically actuable latch 38 may include a base portion 56, which may include a base portion end 58 and a latching portion 62 which may include a latching portion end 64. Protruding from the latching portion end 64, the magnetically actuable latch 38 includes one or more teeth 66, ribs, notches, jags, points, curves, voids, or other shapes such as those described herein with respect to embodiments of the magnetically actuable latch 38, while the base portion end 58 may be flat or another shape. In one embodiment, each ridge or tooth 66 may have a rise of approximately 1.36 mm and a run of approximately 0.46 mm. Exemplary ratios of rise to run can be approximately 3:1, 4:1 or 5:2. It is understood however, that these examples are not limiting and that other ratios can be used depending on the design requirements and the object to be secured.

In an embodiment where the magnetically actuable latch 38 is toothed at its latching portion end 64, the latching side 34 of the securing mechanism 16 may be configured with ribs 54 that engage the teeth 66 of the magnetically actuable latch 38 in the locking position. The flexible locking element 40 is biased to exert a force on the base portion end 58 to engage the teeth 66 of the latching portion end 64 into the teeth 54 of the latching side 34 of the strap 20 to prevent the strap 20 from being pulled away from the housing 16. The flexible locking element 40 prevents the base portion 56 from disengaging the latching side 34 of the strap 20 unless the magnetically actuable latch 38 is being pulled away from the latching side 34 by a magnetic force, such as that exerted by a detacher 14.

The flexible locking element 40 may be shaped as desired, such as in a cuboid, ellipsoid, coil, or any other shape such as described herein with respect to the embodiments of the flexible locking element 40 and may include one or more pieces, or may be combined or integrally formed with the magnetically actuable latch 38. In one embodiment, the flexible locking element 40 may be shaped as a cantilever arm, such as, for example, a leaf spring. The flexible locking element 40 may comprise or may be formed of a flexible material such as a light, porous, semi-rigid, elastic, gaseous, and/or spongy material that may provide a resistant force when compressed and may partially or fully recover its uncompressed shape when the compressive force is removed. For example, in various embodiments, the flexible locking element 40 may comprise or may be formed of a foam rubber, polymeric foam, ceramic foam, or other foam; a rubber; and/or another material or materials. The flexible locking element 40 may also or alternatively be configured to provide the resistant force when compressed. For example, in various embodiments the flexible locking element 40 may be configured as a coil, leaf or other cantilevered arm, or other spring, or other like member, that comprises a metal, polymer, ceramic, and/or another material or materials. The flexible locking element 40 may have any of various masses.

Additionally, the combination of forces applied to the strap 20 by the flexible locking element 40 and the flexible channel element 32, in the locked position, produce a torque upon the strap 20 which further serves to allow the securing side 22 of the strap 20 to firmly grip the protected article. The magnetically actuable latch 38 may be configured as desired, may comprise one or more pieces, and may be symmetrical or unsymmetrical about any point, line, or plane. For example, in various embodiments the magnetically actuable latch 38 may be configured with a "T", "I", curved, or other shape of face and with a rectangular, circular, thick, hollow or otherwise voided, and/or non-uniform cross-section, or as described herein with respect to embodiments of the magnetically actuable latch 38. In addition, the base portion end 58 may be continuous or discontinuous. The magnetically actuable latch 38 may be configured such that at least a portion of it, such as the latching portion 62, may engage, receive, insert into, or otherwise mate with the latching side 34 of the securing mechanism 16, such as described herein. The magnetically actuable latch 38 may comprise or may be formed of a magnetic material such as iron, nickel, or cobalt, or an alloy of iron, nickel, or cobalt. In one embodiment, the magnetically actuable latch 38 includes one or more magnetic materials and may also include one or more nonmagnetic materials.

In one embodiment, the magnetically actuable latch 38 and the flexible locking element 40 are contained within the protrusion 24 of the housing 16 opposite the securing side 22. The protrusion 24 is designed to fit into an indented detaching zone 26 of the magnetic tag detacher 14 (FIG. 1) in order to remove the security tag 12 from the protected article. The magnetic tag detacher 14 applies a magnetic field which attracts the magnetically actuable latch 38 with enough force to overcome the upward force supplied by the flexible locking element 40 such that the ridges or teeth 66 of the magnetically actuable latch 38 disengage from the ridges or teeth 54 of the latching side 34 of the strap 20, thereby allowing the strap 20 to move freely in the channel 44 and releasing the article.

The detectable security element 30 is positioned within a chamber in the housing 16 and may be any detectable device or system, such as any security tag or label.

Figure 3:
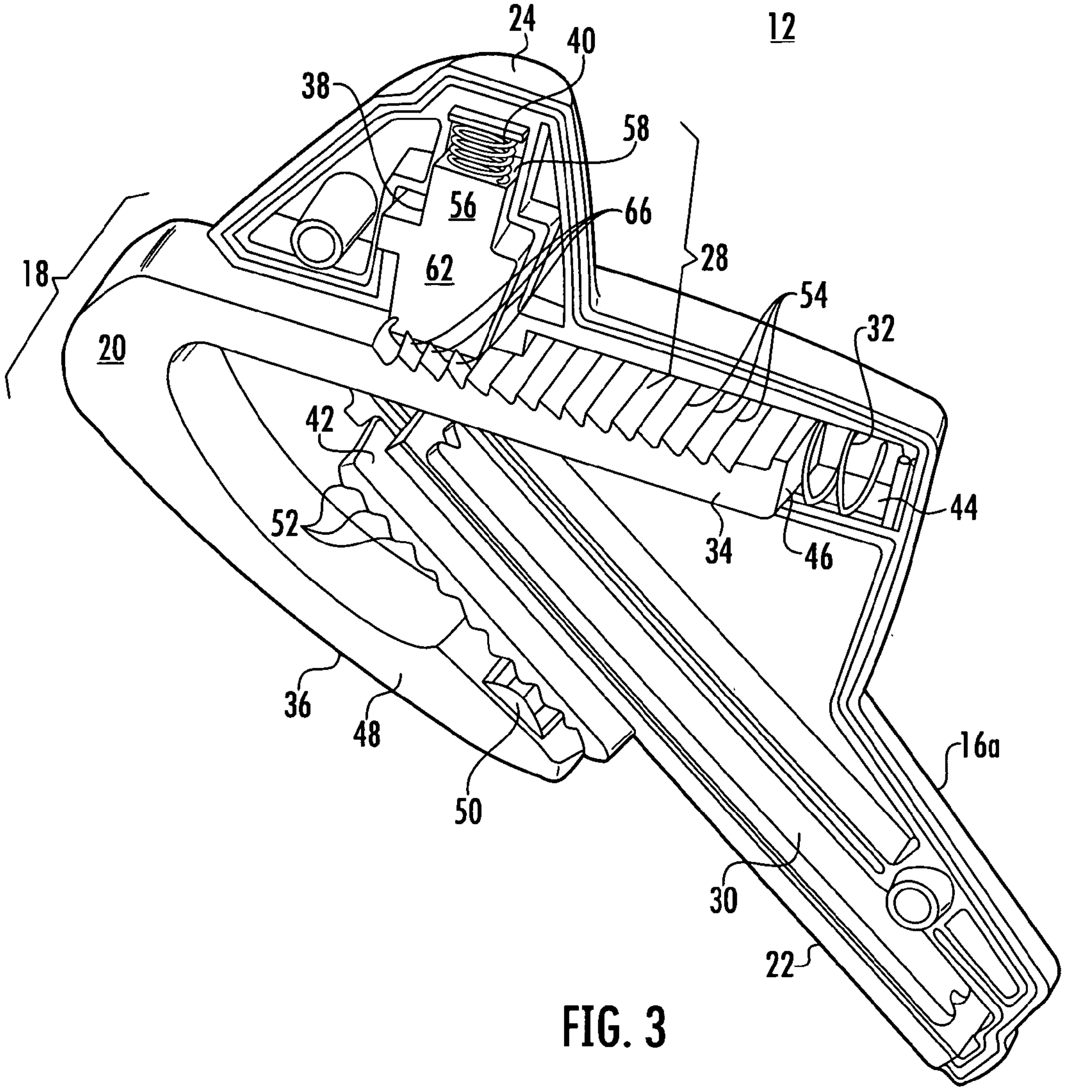
FIG. 3 is a left-side/front perspective view of the pinless device of FIG. 2.
Figure 4:
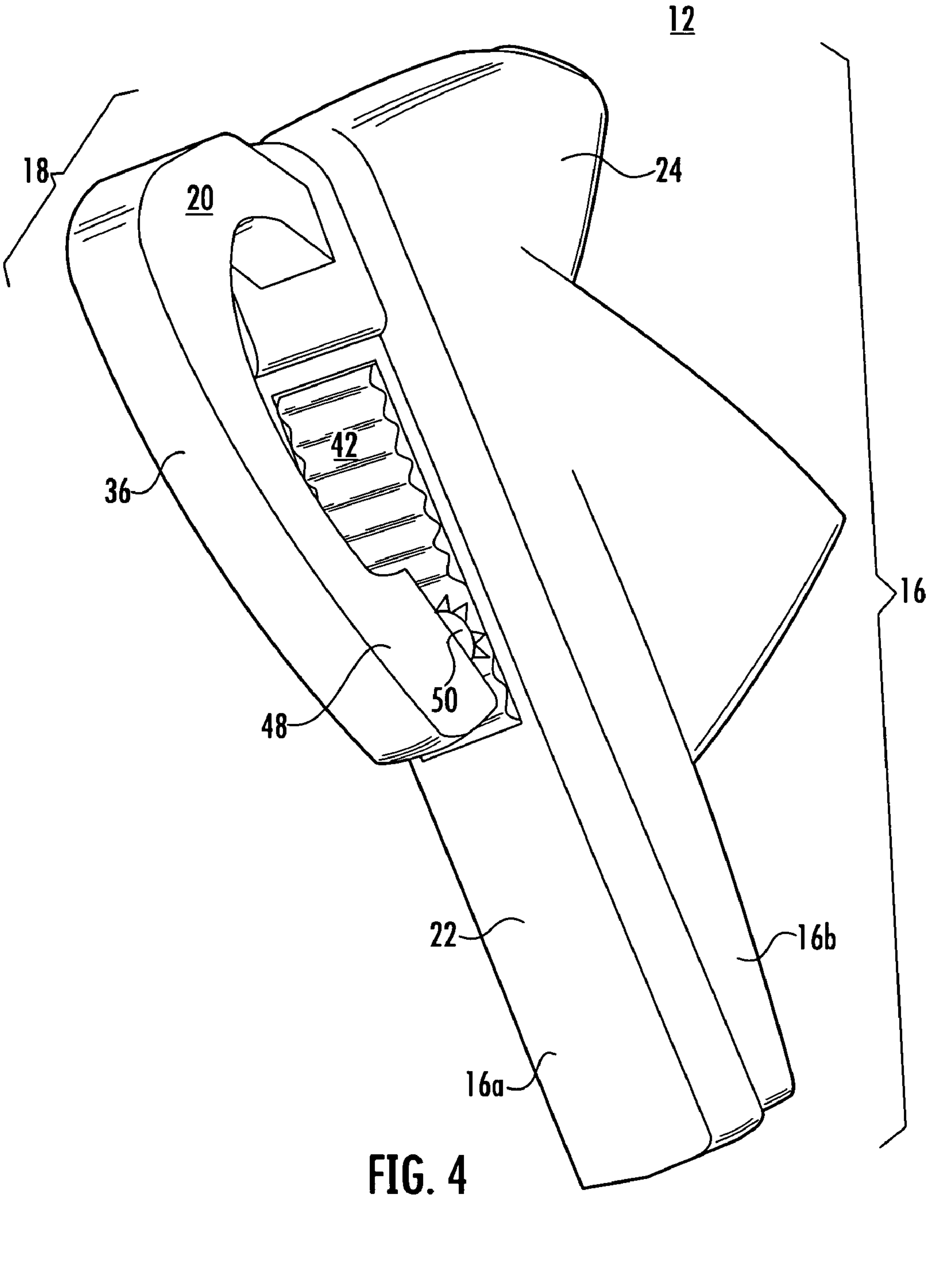
FIG. 4 is a rear/left-side perspective view of the pinless device of FIG. 2.

FIG. 3 illustrates a left-side/front perspective view of a security device 12 with the left half 16*b* of the housing removed. FIG. 4 illustrates a rear/left-side perspective view of the security device 12 of FIG. 1. In the embodiment shown in FIGS. 1-4, the detectable security element 30 is oriented such that the longitudinal axis of the detectable security element 30 is parallel to the strap 20. Thus, security tag 12 may be referred to as the "vertical embodiment".

Figure 5:
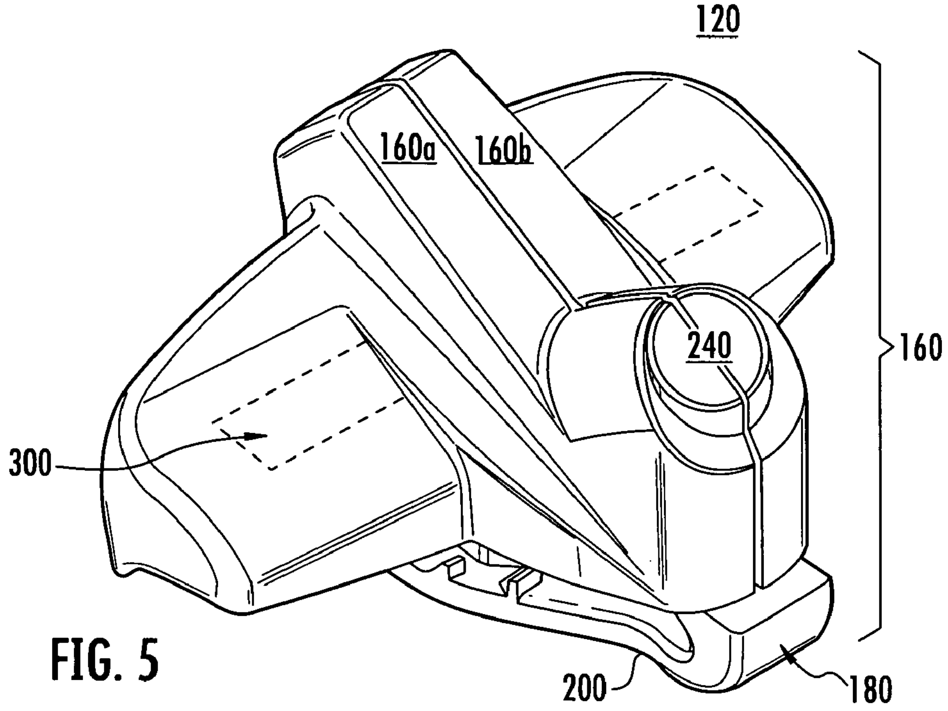
FIG. 5 is a top/right-side/front perspective view of a pinless device constructed in accordance with another embodiment.

Referring now to FIG. 5, an alternative embodiment of a security tag 120 is shown. In contrast to security tag 12 described in relation to FIGS. 1-4, the longitudinal axis of the detectable security element 300 of the illustrated embodiment is perpendicular to the strap 200. Thus, the security tag 120 will hereinafter be referred to as the "horizontal embodiment".

The horizontal embodiment of a security tag 120 may include a housing 160 having two conjoining halves 160*a*, 160*b* molded from a polymer and/or another material or materials. A securing mechanism 180, such as a strap 200, is movable between an open position and a locked position. When security device 120 is attached to an article, the strap 200 is moved to the closed position where the article is trapped or sandwiched between the strap 200 and a securing side 220 of the housing 160.

Figure 6:
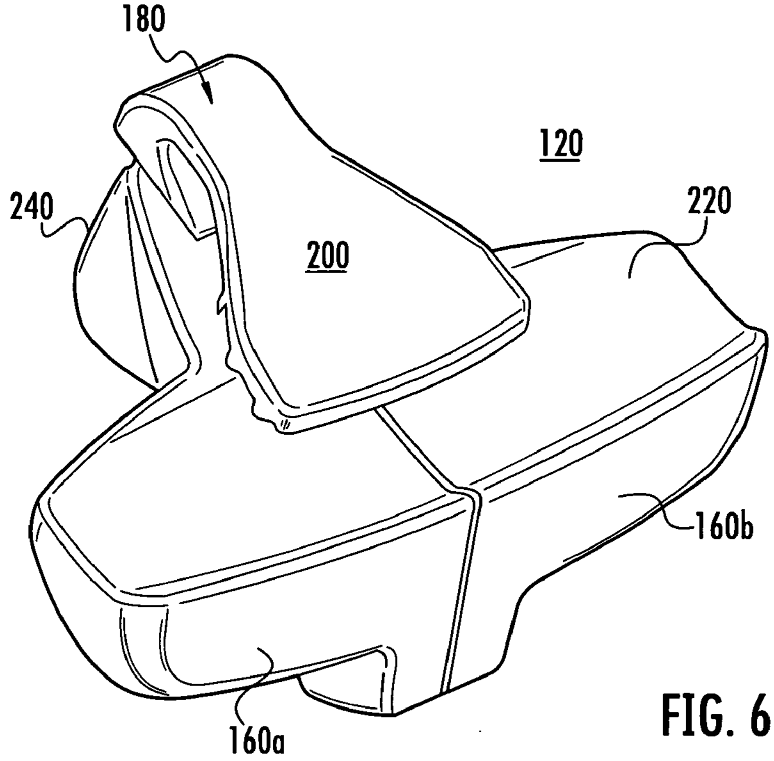
FIG. 6 is a bottom/right-side/front perspective view of the pinless device of FIG. 5.

The housing 160 further includes a protrusion 240 designed to fit into an indented detaching zone 26 of a magnetic tag detacher 14 to configure the strap 200 from the locked position to the open position in order to enable removal of the security tag 120 from the protected article. FIG. 6 illustrates a bottom/right-side/front perspective view of the security device 120 of FIG. 5.

Figure 7:
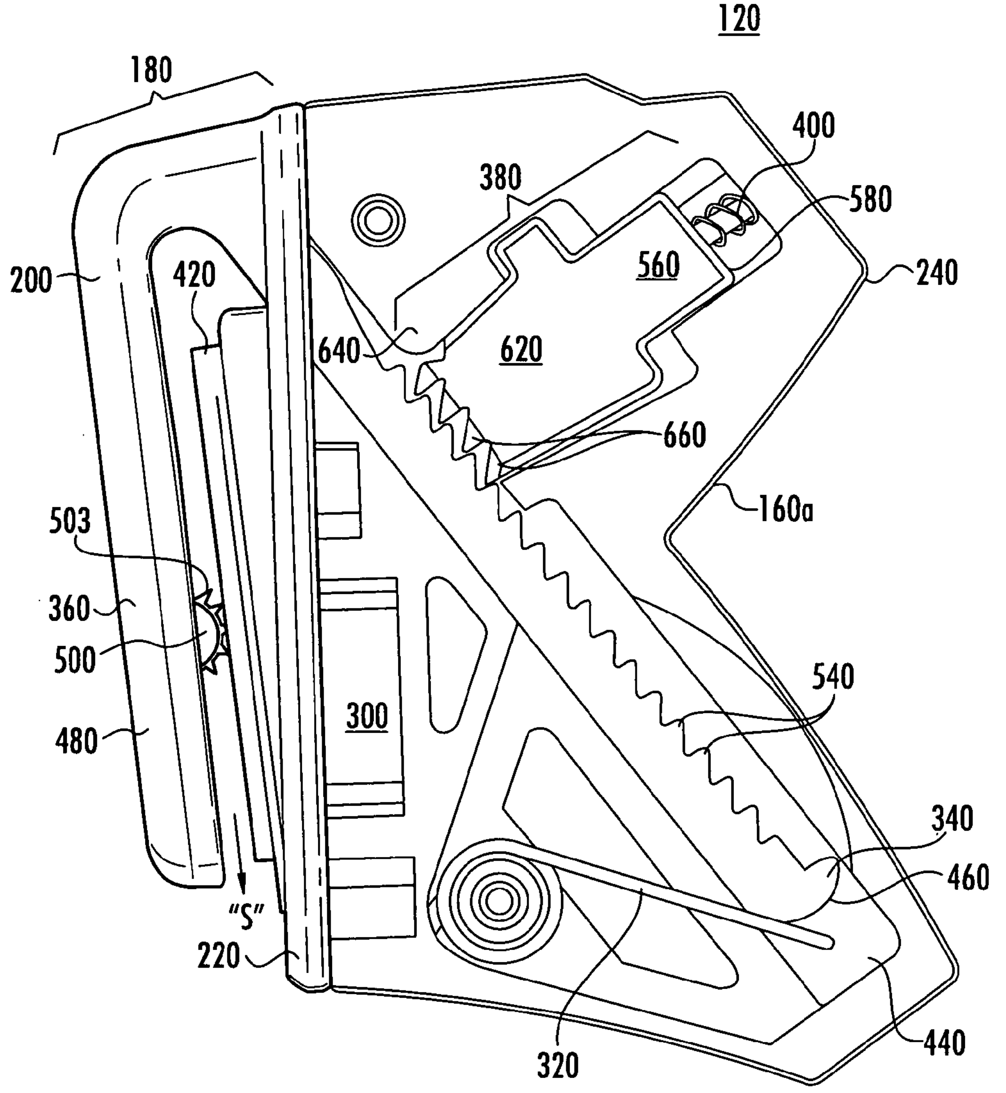
FIG. 7 is a right-side view of the pinless device of FIG. 5 with the right half of the housing removed.

Referring now to FIG. 7 a right-side view of the security device 120 with the right half 160*b* of the housing 160 removed is provided. The security device 120 may include a securing mechanism 180, a locking mechanism 280, a detectable security element 300 and a housing 160. The securing mechanism 180 may include a strap 200 and a flexible channel element 320. The strap 200 has a latching side 340 and a securing side 360. The locking mechanism 280 may be a magnetically actuable locking mechanism, and may include a magnetically actuable latch 380 and a flexible locking element 400. T he flexible locking element 400, e.g., a spring, in a locked position, is biased to apply an upward force on the magnetically actuable latch 380, thereby causing the magnetically actuable latch 380 to engage the latching side 340 of the securing mechanism 180.

The housing 160 may be any casing or other structure that partially or fully contains and/or surrounds, encloses, affixes to, interlocks with, or otherwise secures the locking mechanism 280 and detectable security element 300, a portion of the securing mechanism 180, and an article when the locking mechanism 280 is in the locking position and the housing 160 is thereby locked. The housing 160 and locking mechanism 280 may cooperate to secure, or lock, the article to the housing 160, and thus the security device 120. The housing 160 may be configured as desired, and may be shaped based upon the shapes of the locking mechanism 280, detectable security element 300, and article for which it is designed to secure, such as described below with respect to embodiments of the housing 160. The housing 160 may include a securing pad 420, which may be integral with the housing 160 or may be a separate piece mounted on the securing side 220 of the housing 160. The housing 160 may alternatively be configured to pair with the securing pad 420. The interior of the housing 160 may further comprise a rectangular channel 440 which encompasses a portion of the latching side 340 of the strap 200 and allows the strap 200 to slide along the channel 440.

In one embodiment, the strap 200 may comprise or may be formed of a non-magnetic material such as extended aluminum or poly-carbonate. The strap 200 may comprise a "U-shaped" or "V-shaped" element wherein one side of the U (or V) is a latching side 340 and the other side is a securing side 360. The angle between the latching side 340 and the securing side 360 is an acute angle of approximately 30-60°. The latching side 340 partially resides in the housing 160 within the rectangular channel 440. The latching side 340 of the strap 200 slides within the channel 440 to allow the strap 200 to move from an open position to a locked position. A flexible channel element 320 is compressed between the bottom surface 460 of the latching side 340 of the strap and an outer wall of the housing 160, thereby biasing the flexible element 320 to apply an upward force to the bottom surface 460 of the latching side 340 of the strap 200 and causing the strap 200 to tend to rest in an open position. The flexible channel element 320 may be a cylindrical spring, an elliptical spring, a cantilever arm, such as, for example, a leaf spring or any other shape, as long as the flexible channel element 320 serves to apply an upward force on the bottom surface 460 of the latching side 340 of the strap 200.

The securing side 360 of the strap 200 includes an end portion 480 having an eccentrically-mounted wheel 500 having the same or similar characteristics of wheel 50 described in relation to the embodiment illustrated in FIGS. 1-4. Thus, wheel 500 may have a plurality of protrusions 501 configured to engage the securing pad 420 on the securing side 240 of the housing 160.

When security device 120 is attached to an article, the strap 200 is moved to a closed position where the article is trapped or sandwiched between the protrusions 503 of the wheel 500 and the securing pad 420 on the securing side 240 of the housing 160. The protrusions 503 "bite" into the material of the article, so that any attempt to remove the security tag 120 by moving it in the direction of arrow "S" will cause the wheel 500 to rotate, which, due to its eccentric mounting, causes the wheel 500 to move closer to the securing pad 420, further pinching the article between the wheel and the pad. As with the previous embodiment, the farther the article is moved in the direction of arrow "S", the greater the pinching force between the wheel 500 and the securing pad 420. In this way, unwanted removal of the security device 12 from the article is prevented.

It will be appreciated that the wheel 500 may also be provided in the housing 160 rather than the strap 200, in a manner the same or similar to that described in relation to the embodiment of FIG. 2E.

In the illustrated embodiment, the securing pad 420 has a smooth surface. It will be appreciated, however, that the securing pad 420 may include protrusions, such as rows of teeth or ridges designed to operate in conjunction with the protrusions 503 of the wheel 500 to securely grip the material of an article and prevent the security device 120 from being removed from the article when the strap 200 is in a locked position. The securing pad 420 may comprise a metal, polymer, ceramic, and/or another material or materials, as long as the material is rigid enough to prevent the housing 160 from being forcibly removed from the article, when secured to the article, without destroying or damaging the detectable security element 300 or article.

The latching side 340 of the strap 200 includes a plurality of parallel ridges 540, such as ribs, teeth, notches, jags, points, curves, voids, or other shapes, which engage the magnetically actuable latch 380 to secure the strap 200 in a locked position and prevent the latching side 340 from being extended from the housing 160. The latching side 340 of the securing mechanism 160 may be configured as desired, such as with one or more holes or other voids, ribs, teeth, protrusions, or other shapes. The latching side 340 may be configured to engage, receive, insert into, or otherwise mate with at least a portion of the magnetically actuable latch 380. The magnetically actuable latch 380 may include a base portion 560, which may include a base portion end 580 and a latching portion 620 which may include a latching portion end 640. Protruding from the latching portion end 640, the magnetically actuable latch 380 includes one or more teeth 660, ribs, notches, jags, points, curves, voids, or other shapes such as those described herein with respect to embodiments of the magnetically actuable latch 380, while the base portion end 580 may be flat or another shape. In an embodiment where the magnetically actuable latch 380 is toothed at its latching portion end 640, the latching side 340 of the securing mechanism 160 may be configured with ribs 540 that engage the teeth 660 of the magnetically actuable latch 380 in the locking position. The flexible locking element 400 is biased to exert a force on the base portion end 580 to engage the teeth 660 of the latching portion end 640 into the teeth 540 of the latching side 340 of the strap 200 to prevent the strap 200 from being pulled away from the housing 160. The flexible locking element 400 prevents the base portion 560 from disengaging the latching side 340 of the strap 200 unless the magnetically actuable latch 380 is being pulled away from the latching side 340 by a magnetic force, such as that exerted by a detacher 14.

The flexible locking element 400 may be shaped as desired, such as in a cuboid, ellipsoid, coil, or any other shape such as described herein with respect to the embodiments of the flexible locking element 400 and may include one or more pieces, or may be combined or integrally formed with the magnetically actuable latch 380. In one embodiment, the flexible locking element 400 may be shaped as a cantilever arm, such as, for example, a leaf spring. The flexible locking element 400 may comprise or may be formed of a flexible material such as a light, porous, semi-rigid, elastic, gaseous, and/or spongy material that may provide a resistant force when compressed and may partially or fully recover its uncompressed shape when the compressive force is removed. For example, in various embodiments, the flexible locking element 400 may comprise or may be formed of a foam rubber, polymeric foam, ceramic foam, or other foam; a rubber; and/or another material or materials. The flexible locking element 400 may also or alternatively be configured to provide the resistant force when compressed. For example, in various embodiments the flexible locking element 400 may be configured as a coil, leaf or other cantilevered arm, or other spring, or other like member, that comprises a metal, polymer, ceramic, and/or another material or materials. The flexible locking element 400 may have any of various masses.

Additionally, the combination of forces applied to the strap 200 by the flexible locking element 400 and the flexible channel element 320, in the locked position, produce a torque upon the strap 200 which further serves to allow the securing side 220 of the strap 200 to firmly grip the protected article.

The magnetically actuable latch 380 may be configured as desired, may comprise one or more pieces, and may be symmetrical or unsymmetrical about any point, line, or plane. For example, in various embodiments the magnetically actuable latch 380 may be configured with a "T", "I", curved, or other shape of face and with a rectangular, circular, thick, hollow or otherwise voided, and/or non-uniform cross-section, or as described herein with respect to embodiments of the magnetically actuable latch 380. In addition, the base portion end 580 may be continuous or discontinuous. The magnetically actuable latch 380 may be configured such that at least a portion of it, such as the latching portion 620, may engage, receive, insert into, or otherwise mate with the latching side 340 of the securing mechanism 160, such as described herein.

The magnetically actuable latch 380 may comprise or may be formed of a magnetic material such as iron, nickel, or cobalt, or an alloy of iron, nickel, or cobalt. In one embodiment, the magnetically actuable latch 380 includes one or more magnetic materials and may also include one or more nonmagnetic materials.

In one embodiment, the magnetically actuable latch 380 and the flexible locking element 400 are contained within the protrusion 240 of the housing 160 opposite the securing side 220. The protrusion 240 is designed to fit into an indented detaching zone 26 of the magnetic tag detacher 14 (FIG. 1) in order to remove the security tag 12 from the protected article. The magnetic tag detacher 14 applies a magnetic field which attracts the magnetically actuable latch 380 with enough force to overcome the upward force supplied by the flexible locking element 400 such that the ridges or teeth 660 of the magnetically actuable latch 38 disengage from the ridges or teeth 540 of the latching side 34 of the strap 200, thereby allowing the strap 200 to move freely in the channel 440 and releasing the article.

The detectable security element 30, 300 may be any detectable device or system, such as any security tag or label. For example, in various embodiments the detectable security element 30, 300 may be any of a variety of types of EAS element (e.g., Radio Frequency element, acousto-magnetic element, etc.), Radio Frequency Identification ("RFID") element, combination EAS/RFID element, smart tag, or other detectable anti-theft or other security element. Where the disclosed device is described with reference to an "EAS system" or using "EAS tags," these terms are used in the general sense and include tags that use one or security elements, (e.g., EAS element, RFID element). The detectable security element 30, 300 may be detectable by a corresponding detecting system or device, such as, depending on the type of security tag or label, an acousto-magnetic detector, electromagnetic detector, radio frequency detector, or other detector.

Figure 8:
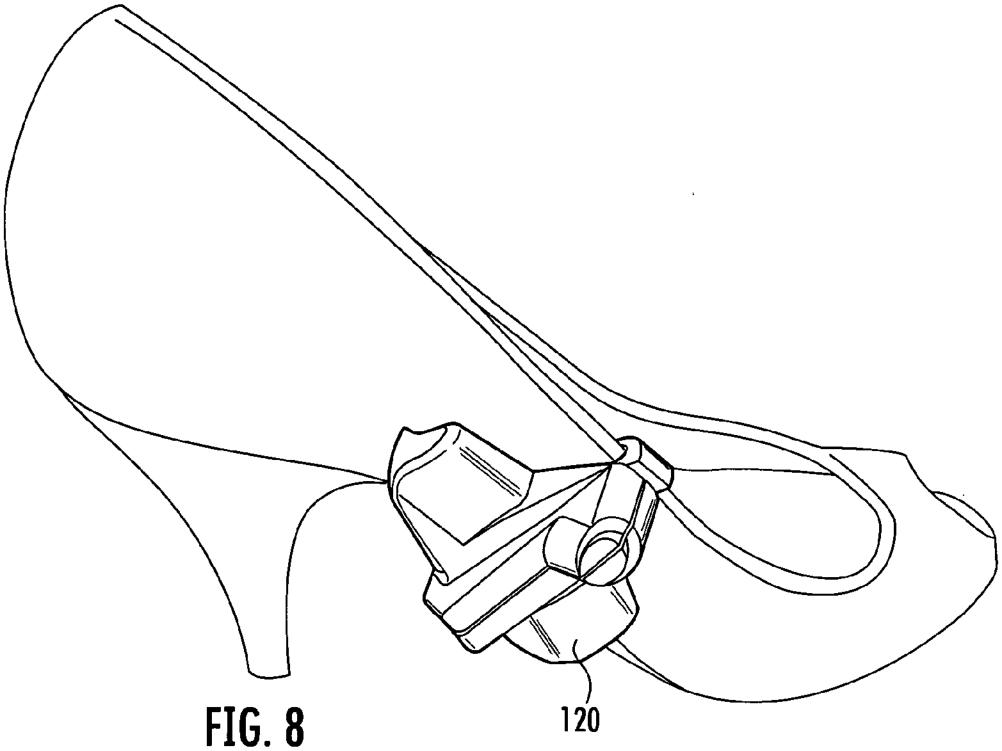
FIG. 8 is an illustration showing the pinless device of FIG. 5 attached to a shoe.
Figure 9:
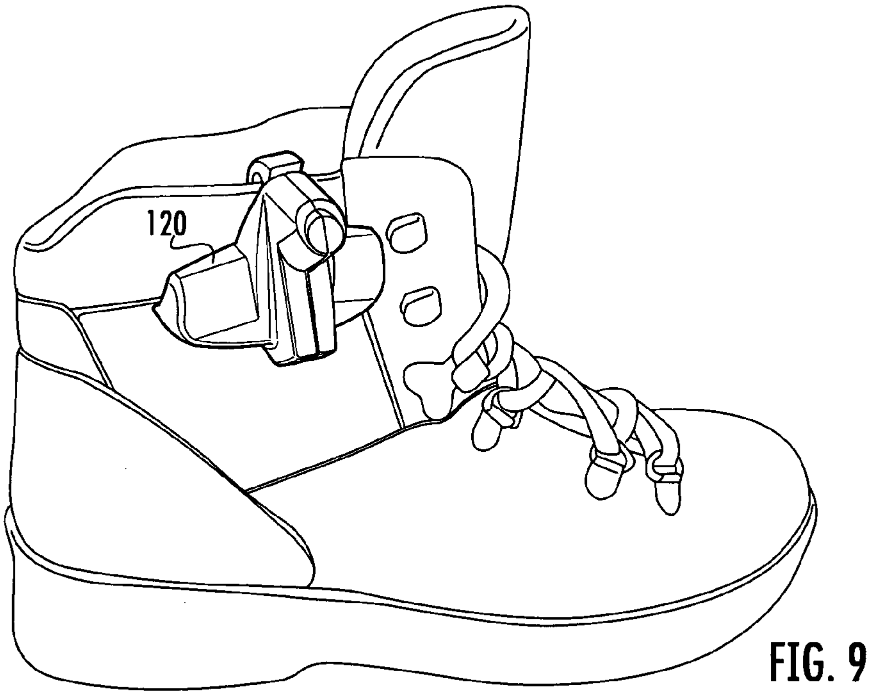
FIG. 9 is an illustration showing the pinless device of FIG. 5 attached to a boot.
Figure 10:
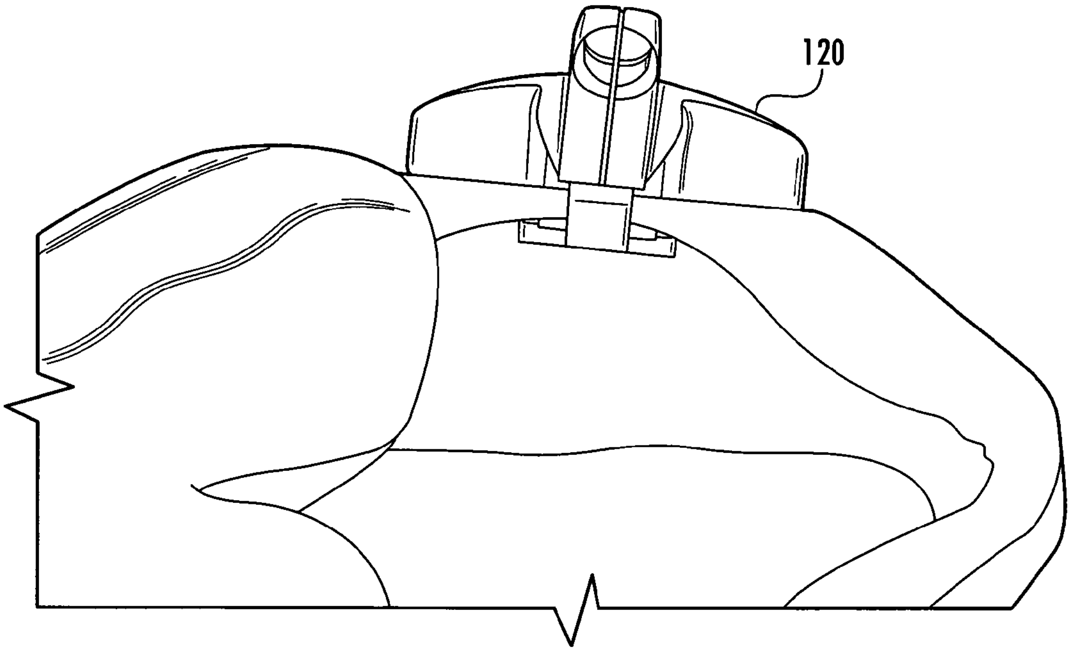
FIG. 10 is an illustration showing a view of the interior of the boot of FIG. 9.

Referring now to FIG. 8, a horizontal embodiment of a security device 120 is illustrated in use attached to a woman's shoe. FIGS. 9 and 10 illustrate a horizontal embodiment of a security device 120 attached to a boot. As may be noted from FIGS. 8-10, embodiments of the disclosed system and device enable a customer to try on the item of merchandise with minimal interference from the security device, while advantageously providing the assurance of protection against theft for the retailer.

Although the disclosure refers to capturing a portion of an article to be secured between a contact pad on the housing and a securing region on the strap, use of the disclosed device is not limited as such. For example, where an article has an opening or an element with an opening such as a handbag strap, handle, ring or belt buckle, the strap of the security tag can be inserted through the opening in the article such that, when in the locked position, the securing region contacts the securing pad thereby locking the security tag to the article.

Unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A security device comprising:

a housing including a securing pad;

a locking element disposed within the housing;

a strap including:

a first end having a latching region insertable into the housing; and a second end having a securing region positionable opposite the securing pad of the housing; and a wheel rotatably mounted on an axle to enable the wheel to rotate with respect to one of the housing and the strap;

wherein the strap is movable between an open position and a locked position, the locking element is engageable with the latching region of the strap, and the strap, when in the locked position, is at least partially retained within the housing to secure an article between the wheel and one of the securing pad and the securing region of the strap.

2. The security device of claim 1, wherein the wheel is eccentrically-mounted and the axle is secured to the securing region of the strap to enable the wheel to rotate with respect to the strap.

3. The security device of claim 2, wherein the axle is mounted with respect to the wheel so that rotation of the wheel in a first direction causes an outer surface of the wheel to move away from the strap and toward the securing pad.

4. The security device of claim 1, wherein the wheel is eccentrically-mounted and the axle is secured to the housing to enable the wheel to rotate with respect to the housing.

5. The security device of claim 4, wherein the axle is mounted with respect to the wheel so that rotation of the wheel in a first direction causes an outer surface of the wheel to move away from the housing and toward the securing region of the strap.

6. The security device of claim 1, wherein the wheel comprises an elastomeric surface.

7. The security device of claim 6, wherein the elastomeric surface comprises at least one protrusion.

8. The security device of claim 1, wherein the locking element includes:

a magnetically actuable latch; and a flexible locking element that biases the magnetically actuable latch and the latching region of the strap into a locked position.

9. The security device of claim 8, further comprising:

a flexible channel element exerting an upward force on the strap, wherein the flexible locking element, in combination with the flexible channel element, creates a torque on the strap such that a portion of the article is captured between the securing side of the strap and the securing pad when in the locked position.

10. The security device of claim 1, wherein the housing further includes a detectable security element chamber and wherein the security device further includes a detectable security element located in the detectable security element chamber.

11. The security device of claim 10, wherein the detectable security element is at least one of an Electronic Article Surveillance ("EAS") tag and a Radio Frequency Identification ("RFID") tag.

12. The security device of claim 1, wherein the wheel is eccentrically-mounted and the axle is secured to the securing pad region to enable the wheel to rotate with respect to the housing.

13. The security device of claim 12, wherein the axle is mounted with respect to the wheel so that rotation of the wheel in a first direction causes an outer surface of the wheel to move away from the housing and toward the securing region of the strap.

14. A system for securing an article, comprising:

a security device including:

a housing having a securing pad region;

a strap having first and second ends, the first end having a latching region insertable into the housing, the second end having a securing region positionable opposite the securing pad region of the housing;

a locking element including a magnetically actuable latch and a flexible locking element to bias the magnetically actuable latch and the latching region of the strap into a locked position; and a wheel rotatably mounted on an axle to enable the wheel to rotate with respect to one of the housing and the strap;

wherein the strap is movable between an open position and a locked position, the locking element is engageable with the latching region of the strap, and the strap, when in the locked position, is at least partially retained within the housing to secure an article between the wheel and one of the securing pad and the securing region of the strap; and a magnetic detacher operable to configure the security device from the locked position to the open position.

15. The security device of claim 14, wherein the wheel is eccentrically-mounted and the axle is secured to the securing region of the strap to enable the wheel to rotate with respect to the strap.

16. The security device of claim 15, wherein the axle is mounted with respect to the wheel so that rotation of the wheel in a first direction causes an outer surface of the wheel to move away from the strap and toward the securing pad region of the housing.

17. The security device of claim 14, wherein the wheel comprises an elastomeric surface.

18. The security device of claim 17, wherein the elastomeric surface comprises at least one protrusion.

19. The security device of claim 14, wherein the housing further includes a detectable security element chamber for receiving a detectable security element.

20. The security device of claim 19, wherein the detectable security element is at least one of an Electronic Article Surveillance ("EAS") tag and a Radio Frequency Identification ("RFID") tag.

21. A method for protecting an article from theft, the method comprising:

affixing a security device to a portion of the article, the security device including:

a housing including a securing pad region;

a locking element disposed within the housing;

a strap, comprising a first end having a latching region insertable into the housing, and a second end having a securing region positionable opposite the securing pad region of the housing; and a wheel rotatably mounted on an axle to enable the wheel to rotate with respect to one of the securing pad region of the housing and the securing region of the strap; and moving the strap from an open position to a locked position to secure an article placed between the strap and the housing between the wheel and the securing pad region or the securing region.

22. The security device of claim 21, wherein the wheel is eccentrically-mounted and the axle is secured to the securing region of the strap to enable the wheel to rotate with respect to the strap.

23. The method of claim 22, wherein the axle is mounted with respect to the wheel so that rotation of the wheel in a first direction causes an outer surface of the wheel to move away from the strap and toward the securing pad region of the housing.

24. The security device of claim 21, wherein the wheel is eccentrically-mounted and the axle is secured to the securing pad region of the housing to enable the wheel to rotate with respect to the housing.

25. The method of claim 24, wherein the axle is mounted with respect to the wheel so that rotation of the wheel in a first direction causes an outer surface of the wheel to move away from the housing and toward the securing region of the strap.

26. The method of claim 21, wherein the wheel comprises an elastomeric surface.

27. The method of claim 26, wherein the elastomeric surface comprises at least one protrusion.

* * * * *